(12) United States Patent
Basinger

(10) Patent No.: US 9,377,131 B2
(45) Date of Patent: Jun. 28, 2016

(54) PIPE PULLER

(71) Applicant: Jon E. Basinger, Elida, OH (US)

(72) Inventor: Jon E. Basinger, Elida, OH (US)

( * ) Notice: Subject to any disclaimer, the term of this patent is extended or adjusted under 35 U.S.C. 154(b) by 0 days.

(21) Appl. No.: 14/598,347

(22) Filed: Jan. 16, 2015

(65) Prior Publication Data
US 2015/0198264 A1 Jul. 16, 2015

Related U.S. Application Data

(60) Provisional application No. 61/928,274, filed on Jan. 16, 2014.

(51) Int. Cl.
*F16L 1/09* (2006.01)

(52) U.S. Cl.
CPC ........................................ *F16L 1/09* (2013.01)

(58) Field of Classification Search
CPC combination set(s) only.
See application file for complete search history.

(56) References Cited

U.S. PATENT DOCUMENTS

| | | |
|---|---|---|
| 1,195,147 A | 8/1916 | Mitchell |
| 3,760,595 A | 9/1973 | Stewart et al. |
| 3,958,704 A | 5/1976 | Wire et al. |
| 4,209,269 A | 6/1980 | Martinez |
| 4,241,803 A * | 12/1980 | Lauber ................... B60G 17/00 180/8.1 |
| 4,384,636 A | 5/1983 | Hillemacher |
| 4,594,027 A | 6/1986 | Becker |
| 4,969,677 A | 11/1990 | Melegari |
| 5,368,413 A | 11/1994 | Moore |
| 5,653,293 A | 8/1997 | Ellis |
| 6,227,765 B1 | 5/2001 | von Trepka |
| 6,969,217 B1 | 11/2005 | Basinger |
| 7,080,957 B2 | 7/2006 | Basinger |
| 2012/0090498 A1* | 4/2012 | Redpath ................. B08B 9/049 104/138.2 |

FOREIGN PATENT DOCUMENTS

DE 3404724 A1 9/1985
JP 2011140287 A * 7/2011

* cited by examiner

*Primary Examiner* — Benjamin Fiorello
*Assistant Examiner* — Kyle Armstrong
(74) *Attorney, Agent, or Firm* — MacMillan, Sobanski & Todd, LLC

(57) ABSTRACT

A pipe puller apparatus includes a body and a main actuator mounted on the body. A strut assembly is also mounted on the body and includes a first shoe and a second shoe. The first shoe is adapted to engage a first interior wall of a pipe and the second shoe is adapted to engage a second interior wall of the pipe. The strut assembly includes a strut actuator that is adapted to increase the distance between the first shoe and the second shoe.

12 Claims, 5 Drawing Sheets

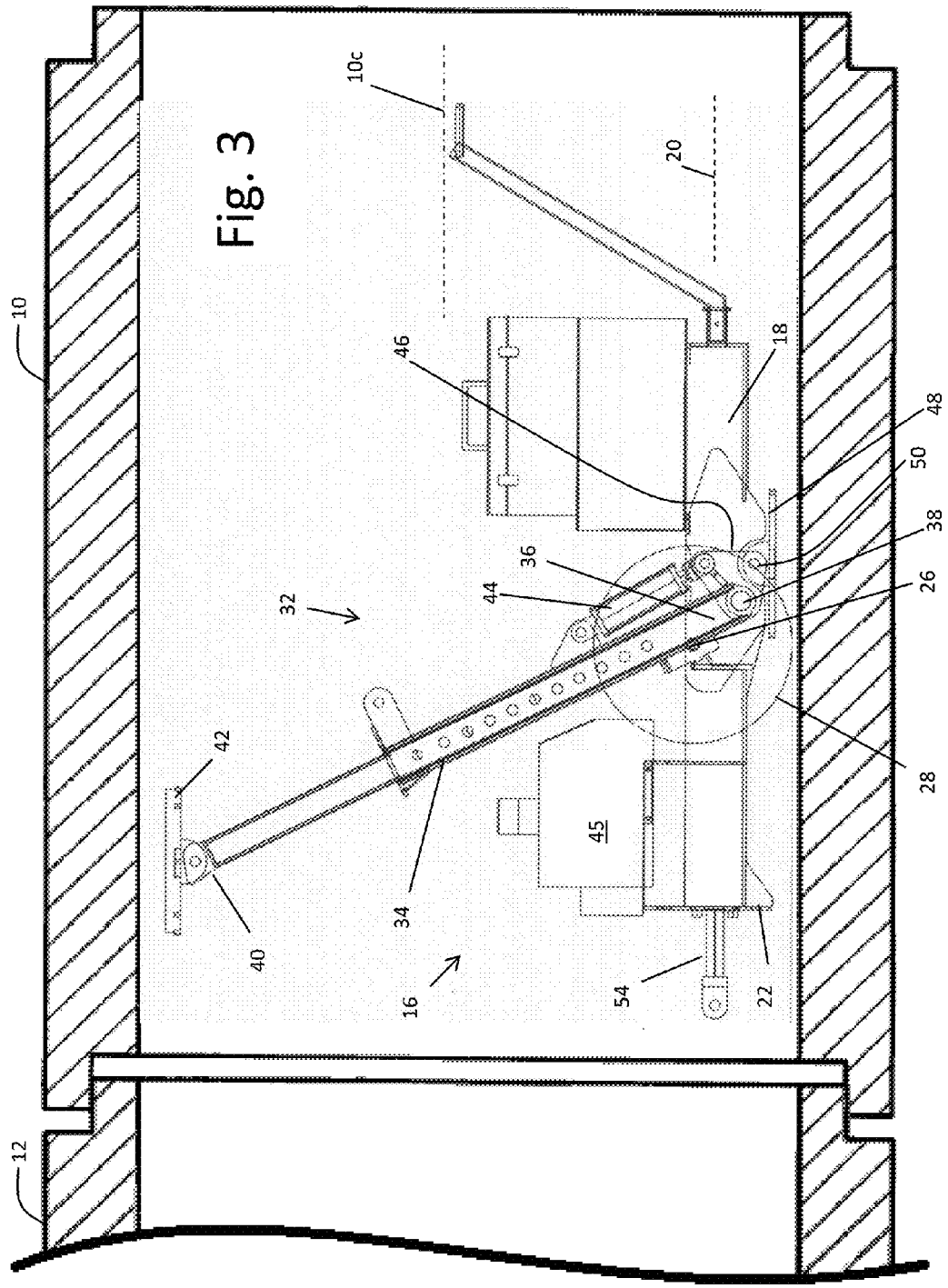

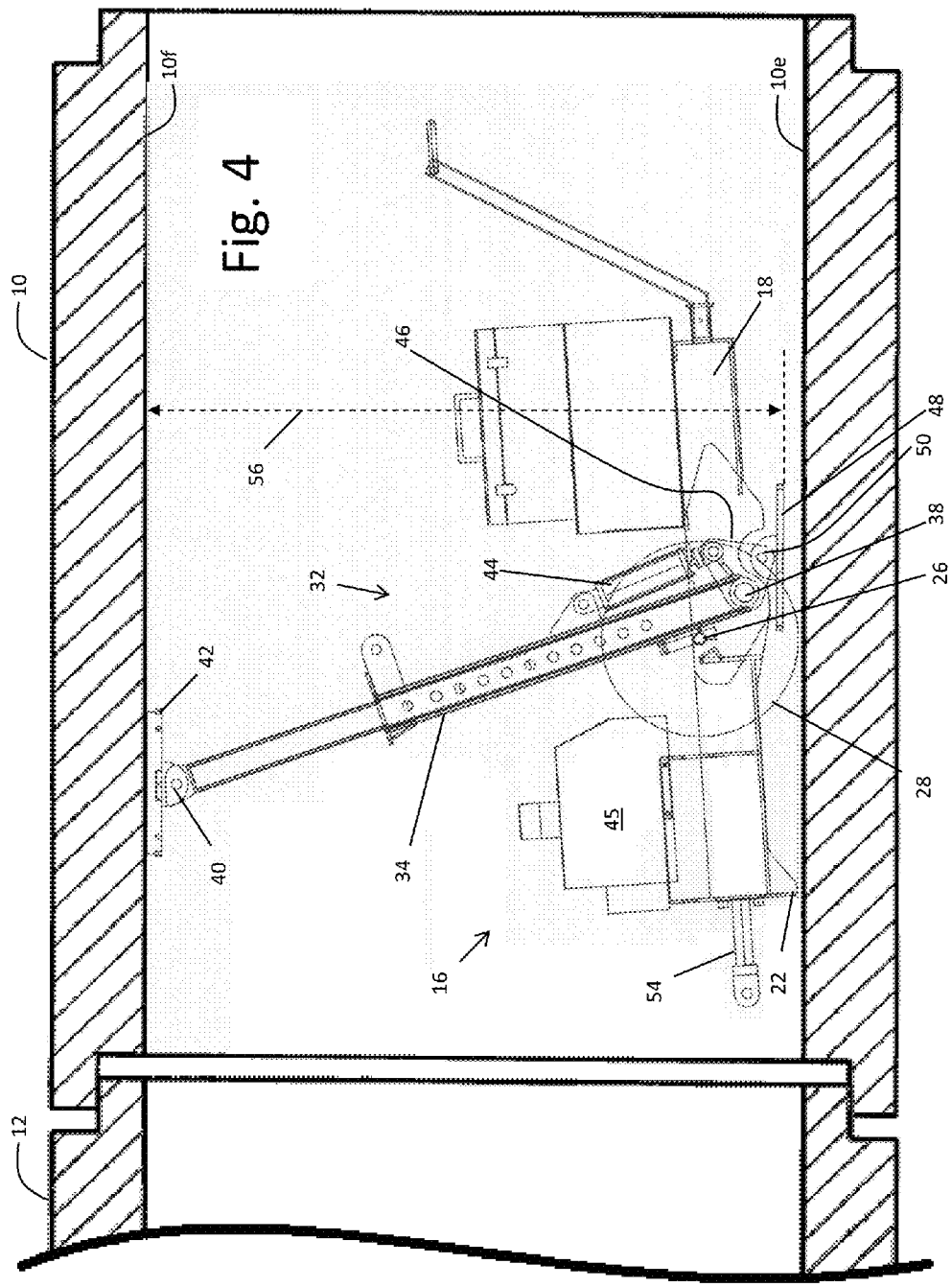

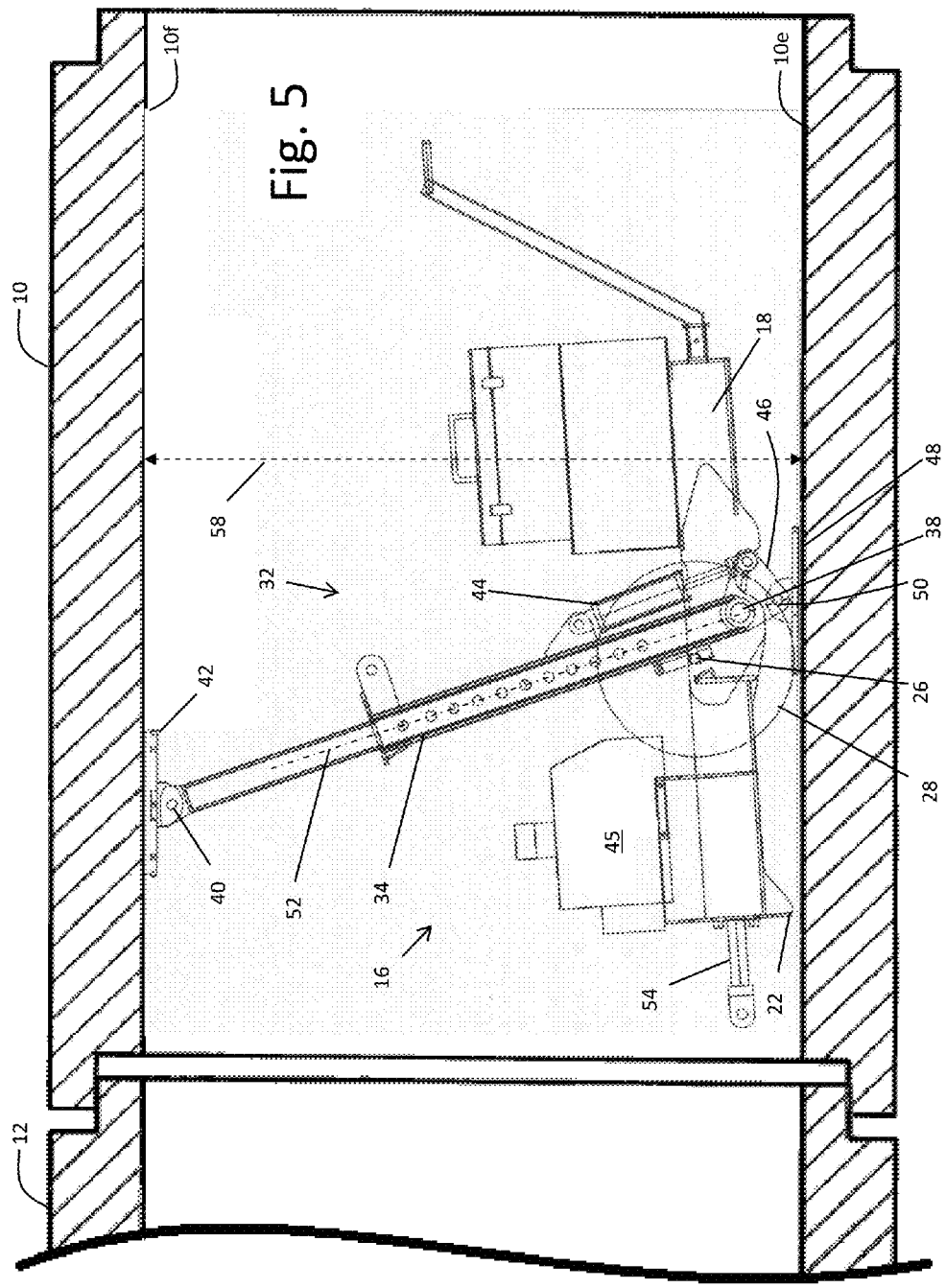

PIPE PULLER

CROSS-REFERENCE TO RELATED APPLICATIONS

This application claims the benefit of U.S. Provisional Application No. 61/928,274, filed Jan. 16, 2014, the disclosure of which is incorporated herein by reference.

BACKGROUND OF THE INVENTION

This invention relates in general to an apparatus for pulling a first pipe into contact with a stationary second pipe, and more particularly to an improved apparatus for pulling a first pipe into contact with a stationary second pipe.

Large pipes are often installed in situations in which it is desired to provide a path for water to flow where it is not desirable to have an open channel. For example, a sewer may be installed below grade in a location where a road will pass over the sewer. Large pipes may be sections of precast, concrete pipe that are abutted end-to-end to provide the desired total length of channel. Each individual section of pipe is typically pulled against a neighboring section, in order to provide an acceptable seal between the sections of pipe.

Known apparatus for pulling pipe can be large, extremely heavy, expensive, and difficult to position within a pipe. It would therefore be advantageous to provide an improved apparatus for pulling pipe that is smaller, lighter, less expensive, and easier to use than known apparatus.

SUMMARY OF THE INVENTION

The invention relates to a pipe puller apparatus. The pipe puller apparatus includes a body and a main actuator mounted on the body. A strut assembly is also mounted on the body and includes a first shoe and a second shoe. The first shoe is adapted to engage a first interior wall of a pipe and the second shoe is adapted to engage a second interior wall of the pipe. The strut assembly includes a strut actuator that is adapted to increase the distance between the first shoe and the second shoe.

Another embodiment of the invention further relates to a pipe puller apparatus that includes a strut mounted on the body for rotation about a strut axle, and a pivot plate mounted on the body for rotation about the strut axle. In this embodiment, the first shoe is mounted on the strut and the second shoe is mounted on the pivot plate.

BRIEF DESCRIPTION OF THE DRAWINGS

FIG. 3 is a side view of the pipe puller, located in the first pipe section in a transport position.

FIG. 4 is a view similar to that of FIG. 3, showing the pipe puller in an initial use position.

FIG. 5 is a view similar to that of FIG. 4, showing the pipe puller in a set position.

DETAILED DESCRIPTION OF THE PREFERRED EMBODIMENT

This application describes an improvement to the pipe puller described in U.S. Pat. No. 6,969,217, the disclosure of which is hereby incorporated by reference. In reference to FIG. 7 of U.S. Pat. No. 6,969,217, the improvement described herein relates in part to a mechanism to release the strut 42 from its wedged position without requiring the use of the release mechanism or push-off tube assembly 74.

Figure 1:
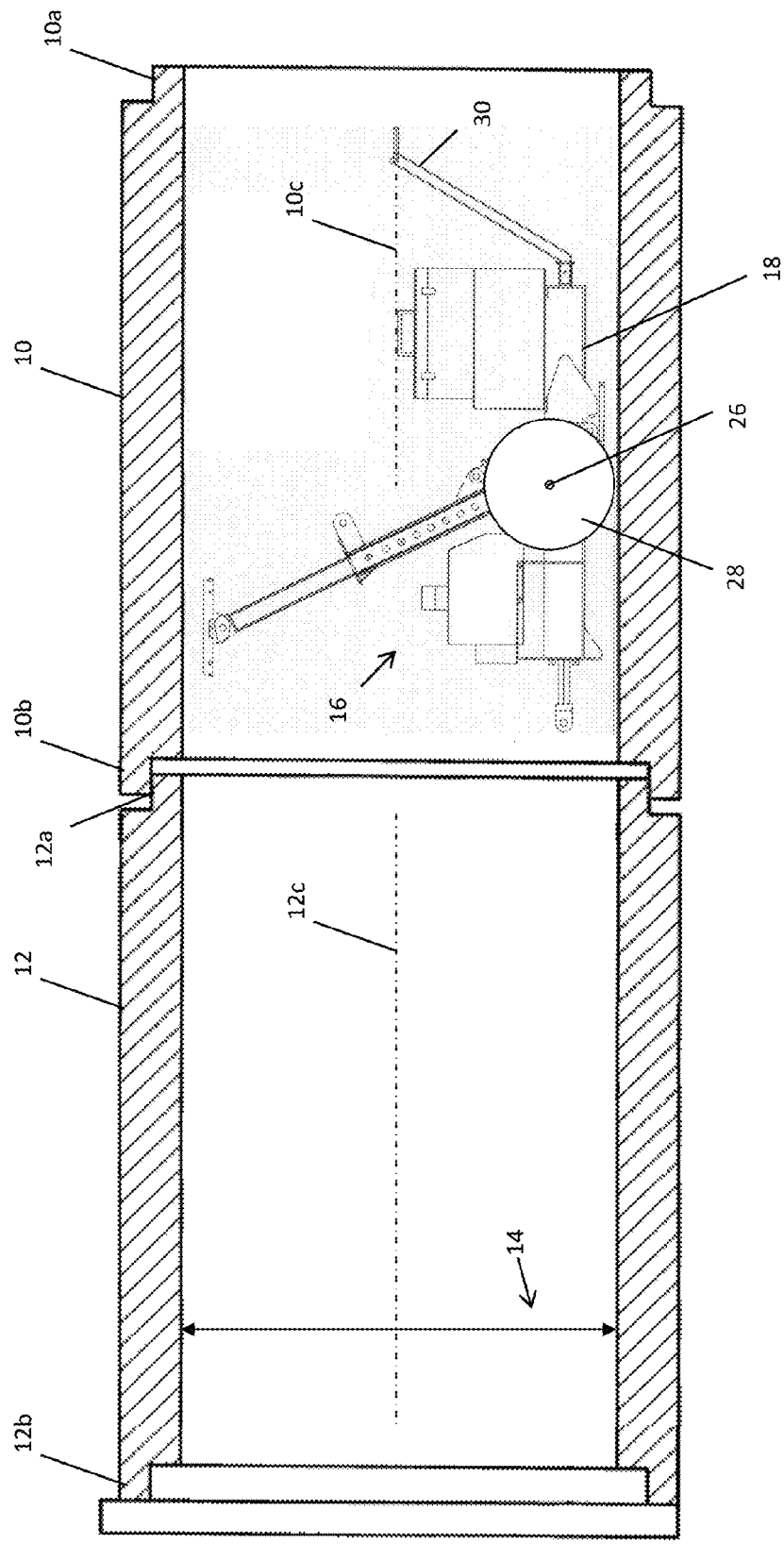
FIG. 1 is a cross-sectional side view of a first pipe section, a second pipe section, and a pipe puller.

Referring to FIG. 1, there is illustrated a cross-sectional side view of a first pipe section 10 and a second pipe section 12. The illustrated first pipe section 10 and second pipe section 12 are preformed concrete pipes, but may be any desired type of pipe. Each of the illustrated first pipe section 10 and the second pipe section 12 are cylindrical culverts having the same inner width indicated at 14. However, it should be appreciated that the first pipe section 10 and the second pipe section 12 may have any desired shapes and dimensions.

The first pipe section 10 includes a first male end 10a and a first female end 10b and defines a first longitudinal axis 10c. Similarly, the second pipe section 12 includes a second male end 12a and a second female end 12b and defines a second longitudinal axis 12c. The second pipe section 12 is disposed so that the second longitudinal axis 12c is generally collinear with the first longitudinal axis 10c. A pipe puller, indicated generally at 16, is positioned within the first pipe section 10. The pipe puller 16 is provided to apply a force to pull the second pipe section 12 toward the first pipe section 10 so that the second male end 12a engages the first female end 10b.

Figure 2:
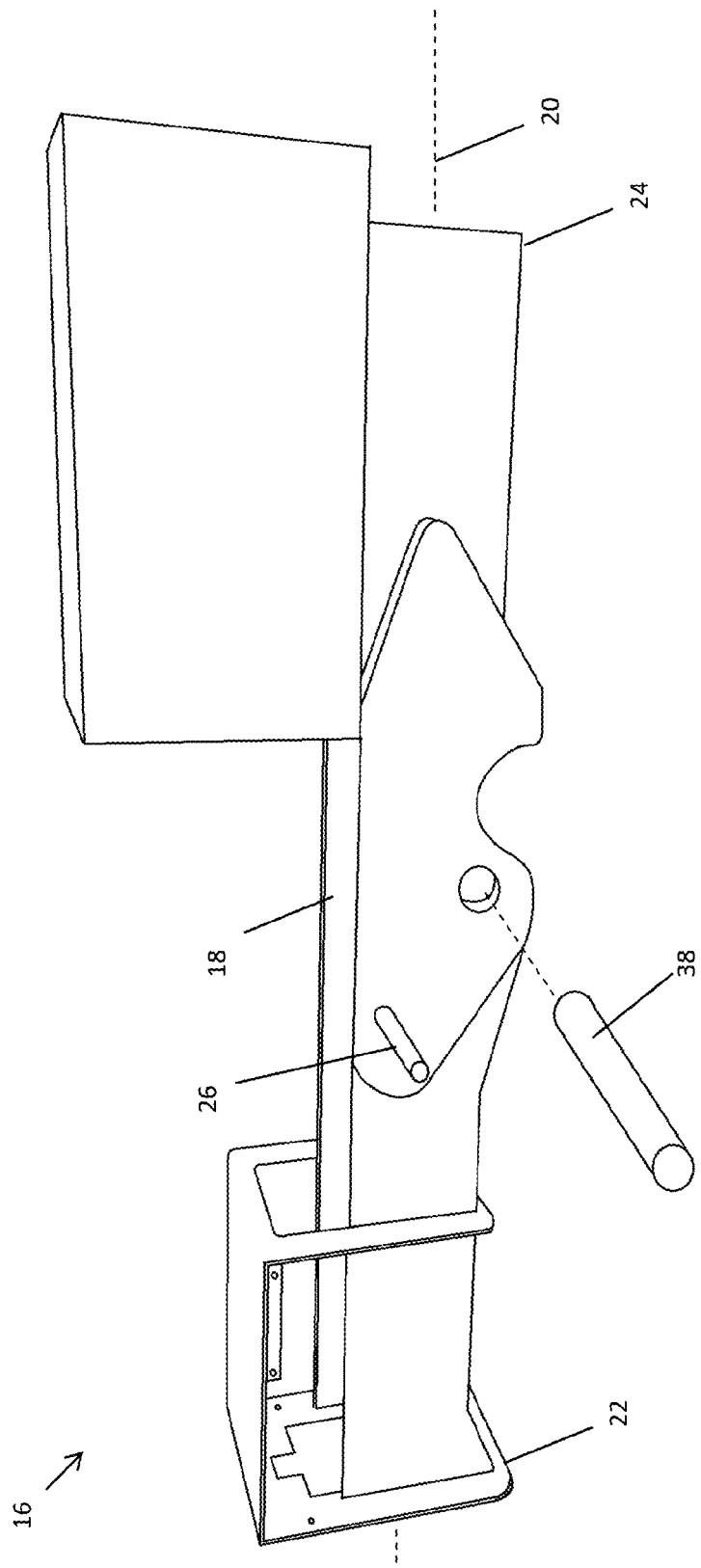
FIG. 2 is a exploded view of the pipe puller.

Referring now to FIG. 2, an exploded view of a portion of the pipe puller 16 is shown. The pipe puller 16 includes a body 18 that extends along a pipe puller axis 20 between a front end 22 and a rear end 24. A wheel axle 26 extends from the body 18 perpendicularly to the pipe puller axis 20. A pair of wheels 28 (one is visible in FIG. 2) is attached to the wheel axle 26 in order to allow the assembled pipe puller 16 to be moved by rolling. A frame handle 30 extends from the body 18 to be used by an operator maneuvering the pipe puller 16. The illustrated body 18 is made of ⅜ inch plate steel, but the body 18 and other components of the pipe puller 16 may be made of any desired materials.

Referring to FIG. 3, a side view of the assembled pipe puller 16 is shown. The wheels 26 are shown illustrated transparently, so that the other components of the pipe puller 16 are visible. The pipe puller 16 includes a strut assembly, indicated generally at 32, that is rotatably attached to the body 18.

The strut assembly 32 includes an adjustable length strut 34. The illustrated adjustable length strut 34 is a telescoping strut that includes an inner section slidable relative to an outer section. However, the strut 34 may be any other type of adjustable length member, or may have a fixed length, if desired. A first end 36 of the strut 34 is pivotally attached to the body 18 by a strut axle 38 that extends perpendicularly to the pipe puller axis 20 and parallel to the wheel axis 26. A second end 40 of the strut 34 is pivotally attached to a first shoe 42. The illustrated first shoe 42 is made of ¾ inch plate steel, but may be made of any desired material.

The strut assembly 32 includes a strut actuator 44 that is pivotally connected to the strut 34 and to a pivot plate 46. The illustrated strut actuator 44 is a hydraulic cylinder, but may be any desired force generating device. The illustrated strut actuator 44 is powered by a power unit 45, which may be a motor, a pump, or any desired source of power to operate the strut actuator 44.

The pivot plate 46 is pivotally attached to the body 18 at an axis that coincides with the strut axle 38. The illustrated pivot plate 46 is pivotally attached to the strut axle 38, but may be attached to the body 18 using a separate component if desired. The strut assembly 32 includes a second shoe 48 that is pivotally attached to the pivot plate 46 at a second shoe axis 50.

In FIG. 3, the pipe puller 16 is shown in a transport position. While in the transport position, the pipe puller 16 may be maneuvered by the operator to a desired location by rolling the pipe puller 16 on the wheels 28. While in the transport position, the pipe puller 16 may be maneuvered to a location where it will be used to pull the second pipe section 12. As shown, the pipe puller 16 is located within the first pipe section 10 and the pipe puller axis 20 is generally aligned with the first longitudinal axis 10c.

The pipe puller 16 is then placed in an initial use position, shown in FIG. 4. The pipe puller 16 is tipped by rotating the body 18 about the wheel axis 26 so that the front end 22 is in contact with a first wall 10e of the first pipe section 10. The strut assembly 36 is rotated about the strut axle 38 so that the first shoe 42 is in contact with a second wall 10f of the first pipe section 10. It should be appreciated that it may be necessary to adjust the length of the strut 34 so that the first shoe 42 is in contact with the second wall 10f. It should be appreciated that the illustrated first wall 10e may be considered the floor of the first pipe section 10 and the illustrated second wall 10f may be considered the ceiling of the first pipe section 10. However, the first wall 10e and second wall 10f may be other desired surfaces of the first pipe section 10.

With the pipe puller 16 in the initial use position, the strut actuator 44 is extended to move the pipe puller 16 to a set position, shown in FIG. 5. As previously described, the strut actuator 44 is pivotally connected to the strut 34 and to the pivot plate 46. When the strut actuator 44 is extended, it causes the pivot plate 46 to rotate relative to the body 18 about the strut axle 38. This causes the second shoe 48 to move downward relative to the body 18 until the second shoe 48 engages the first wall 10e of the first pipe section 10. At this point, further extension of the strut actuator 44 continues to rotate the pivot plate 46 relative to the body 18, and will cause the body 18 to rise relative to the second shoe 48 and relative to the first wall 10e. In the illustrated embodiment, the strut actuator 44 is extended until the second shoe axis 50 is in-line with a centerline 52 of the strut.

It should be appreciated that in the set position, the first shoe 42 is compressed against the second wall 10f and the second shoe 48 is compressed against the first wall 10e. The strut 34 is wedged in the first pipe section 10, while the body 18 is able to rotate relative to the strut assembly 36 about the strut axle 38. The pipe puller 16 includes a main actuator 54 that may be used to pull the second pipe section 12. The illustrated main actuator 54 is a hydraulic cylinder, but may be any desired force generating device. The main actuator 54 may be driven by the power unit 45. The operation of the main actuator 54 to pull the second pipe section 12 is conventional in the art and will not be described in detail. It should be appreciated that both the strut actuator 44 and the main actuator 54 may be operated using a wireless remote control (not shown).

It should be appreciated that when the pipe puller 16 is in the initial use position (shown in FIG. 4), the body 18 is supported on the second wall 10f by the wheels 28, and the supporting surface of the wheel 28 is farther from the body 18 than the second shoe 48 is. However, when the pipe puller 16 is in the set position (shown in FIG. 5), the body 18 is supported on the second wall 10f by the second show 48, and the second shoe 48 is farther from the body 18 than the wheel 28 is.

When the operator wishes to remove the pipe puller 16 from the set position, the strut actuator 44 is retracted. This causes the pivot plate 46 to rotate relative to the body 18 and causes the pipe puller to move from the set position shown in FIG. 5 to the initial use position shown in FIG. 4. It should be appreciated that the body 18 initially moves downward relative to the second shoe 48 until the wheels 28 are in contact with the first wall 10e. Then the second shoe 48 will be raised relative to the body 18 until the pipe puller 16 is in the initial use position. The strut 34 may then be rotated relative to the body 18 so that the first shoe 42 is not in contact with the second wall 10f, and the pipe puller 16 is then in the transport position shown in FIG. 3.

Referring back to FIG. 4 and FIG. 5, the pipe puller 16 has an initial overall strut height 56 when the pipe puller 16 is in the initial use position (shown in FIG. 4), and a set overall strut height 58 when the pipe puller is in the set position (shown in FIG. 5). The initial overall strut height 56 and the set overall strut height 58 of the pipe puller 16 are measures of the distance between the first shoe 42 and the second shoe 48. The set overall strut height 58 is greater than the initial overall strut height 56. This is caused by the rotation of the pivot plate 46 moving the second shoe 48 downward relative to the body 18. In the illustrated embodiment, the rotation of the pivot plate 46 causes the set overall strut height 58 to be 1.75-inches greater than the initial overall strut height 56. However, it should be appreciated that the change in the set overall strut height 58 may be any other desired value. It should be appreciated that the increase in set overall strut height 58 may be changed by using different dimensions for the pivot plate 46, or by changing the clearance between the second shoe 48 and the first wall 10e when the pipe puller 16 is in the transport position.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A pipe puller apparatus, comprising:
a body;
a main actuator mounted on the body; and
a strut assembly mounted on the body and including a first shoe adapted to engage a first interior wall of a pipe, a second shoe adapted to engage a second interior wall of the pipe, and a strut actuator adapted to increase the distance between the first shoe and the second shoe;
wherein the strut assembly includes a strut rotatably mounted to the body for rotation relative to the body and a pivot plate mounted to the body for rotation relative to the body, wherein the strut actuator is mounted on the strut and the strut actuator is adapted to rotate the pivot plate relative to the body, and the strut and the pivot plate rotate relative to the body on substantially the same rotational axis.

2. The pipe puller apparatus of claim 1, wherein the main actuator is adapted to provide a force to pull a second pipe.

3. The pipe puller apparatus of claim 1, wherein the strut assembly is rotatably mounted to the body.

4. The pipe puller apparatus of claim 1, wherein the second shoe is rotatably attached to the pivot plate.

5. The pipe puller apparatus of claim 1, wherein the first shoe is rotatably attached to the strut.

6. The pipe puller apparatus of claim 1, further comprising a wheel mounted on the body and adapted to engage the second interior wall of the pipe in order to support the body relative thereto.

7. The pipe puller apparatus of claim 6, wherein the strut actuator is adapted to move the second shoe between an initial position wherein the second shoe is closer to the body than the wheel, and a set position wherein the second shoe is farther from the body than the wheel.

8. A pipe puller apparatus comprising:
a body;
a main actuator mounted on the body; and
a strut assembly including a strut mounted on the body for rotation about a strut axle, a pivot plate mounted on the body for rotation about the strut axle, a strut actuator attached to the strut and the pivot plate and adapted to rotate the strut relative to the body about the strut axle and to rotate the pivot plate relative to the body about the strut axle, a first shoe mounted on the strut and adapted to engage a first interior wall of a pipe, and a second shoe mounted on the pivot plate and adapted to engage a second interior wall of the pipe.

9. The pipe puller apparatus of claim 8, wherein the strut actuator is adapted to increase the distance between the first shoe and the second shoe.

10. The pipe puller apparatus of claim 8, wherein the main actuator is adapted to provide a force to pull a second pipe.

11. The pipe puller apparatus of claim 8, further comprising a wheel mounted on the body and adapted to engage the second interior wall of the pipe in order to support the body relative thereto.

12. The pipe puller apparatus of claim 11, wherein the strut actuator is adapted to move the second shoe between an initial position wherein the second shoe is closer to the body than the wheel, and a set position wherein the second shoe is farther from the body than the wheel.

* * * * *